(12) United States Patent
Koltick

(10) Patent No.: US 8,461,534 B1
(45) Date of Patent: Jun. 11, 2013

(54) DETECTION OF BURIED EXPLOSIVES

(75) Inventor: David S. Koltick, Lafayette, IN (US)

(73) Assignee: Purdue Research Foundation, West Lafayette, IN (US)

(*) Notice: Subject to any disclaimer, the term of this patent is extended or adjusted under 35 U.S.C. 154(b) by 89 days.

(21) Appl. No.: 13/244,536

(22) Filed: Sep. 25, 2011

Related U.S. Application Data

(63) Continuation of application No. 12/766,614, filed on Apr. 23, 2010.

(60) Provisional application No. 61/172,207, filed on Apr. 23, 2009.

(51) Int. Cl.
*G01F 23/00* (2006.01)

(52) U.S. Cl.
USPC .................................................. 250/358.1

(58) Field of Classification Search
USPC ............... 250/358.1, 390.01, 390.04, 359.1
See application file for complete search history.

(56) References Cited

U.S. PATENT DOCUMENTS

| 3,997,787 | A | * | 12/1976 | Fearon et al. | 250/359.1 |
| 5,159,617 | A | * | 10/1992 | King et al. | 378/57 |
| 2007/0221863 | A1 | * | 9/2007 | Zipf | 250/461.1 |
| 2009/0283690 | A1 | * | 11/2009 | Bendahan | 250/390.01 |
| 2010/0065727 | A1 | * | 3/2010 | Choi | 250/251 |

* cited by examiner

*Primary Examiner* — David Porta
*Assistant Examiner* — Faye Boosalis
(74) *Attorney, Agent, or Firm* — John V. Daniluck; Bingham Greenebaum Doll LLP

(57) ABSTRACT

A system and method are described for capturing and analyzing gamma rays from neutron excitation of a region in 3-space being analyzed for explosives. A processor analyzes the results, determining whether underground explosives are present in a particular region of the ground. In one embodiment, one gamma ray energy band is used to infer an amount of silicon in the region, while another indicates the combined amount of silicon and nitrogen. The concentration of nitrogen in the region is inferred and used to trigger an "explosive found" or a "no explosive found" signal. In other embodiments, the system or method uses inferences about other elemental constituents of the ground being examined, sometimes taking as input analyzes from prior scans, and providing output indicating the likelihood of the presence of explosives in the region.

16 Claims, 11 Drawing Sheets

DETECTION OF BURIED EXPLOSIVES

REFERENCE TO RELATED APPLICATION

This application is a continuation of U.S. application Ser. No. 12/766,614, filed Apr. 23, 2010, pending, which was a nonprovisional of U.S. Provisional Application No. 61/172,207, filed Apr. 23, 2009. This application claims priority to each of these prior applications.

FIELD

The present invention relates to radiant energy. More specifically, the present invention relates to a system using neutron-responsive means for elemental analysis in explosives underground.

DESCRIPTION

Figure 1:
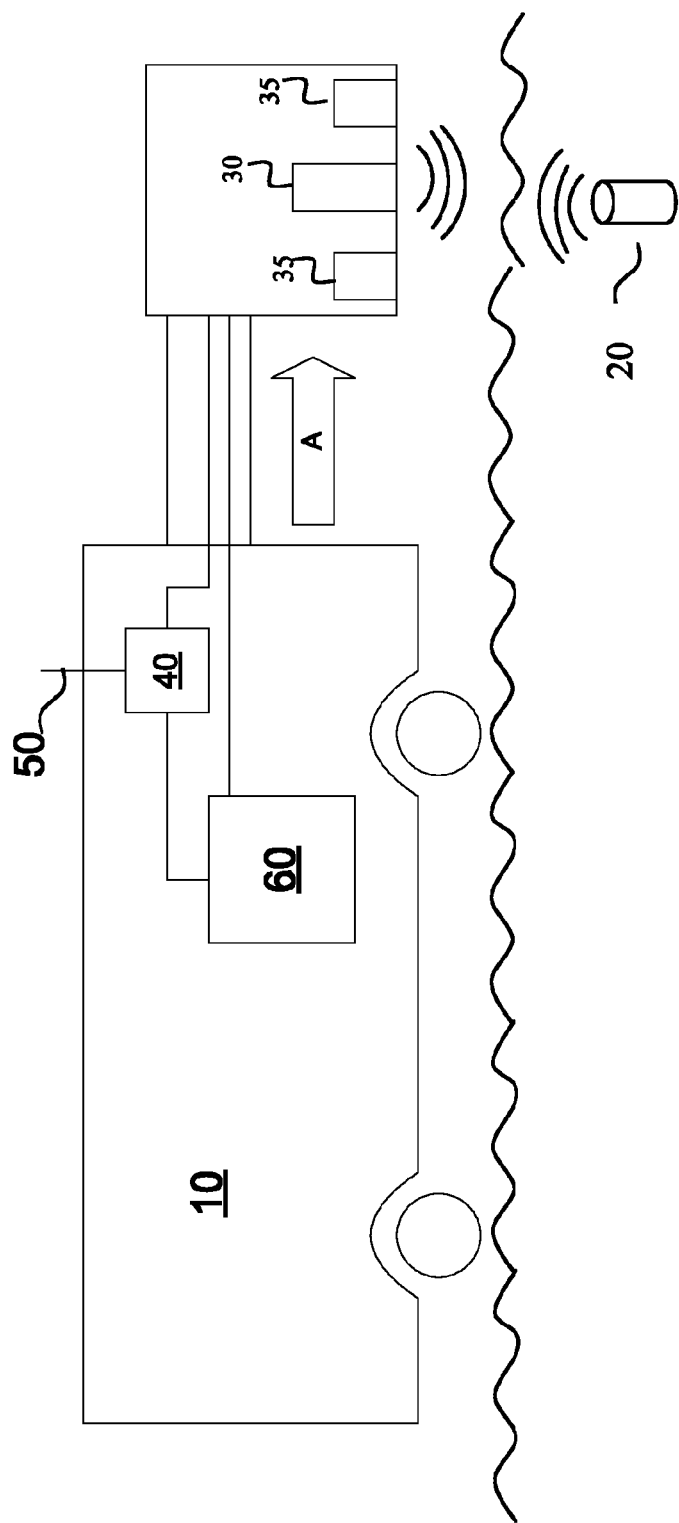
FIG. 1 is a side-view block diagram of a vehicle-mounted explosive detection system according to one embodiment.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, one form of the present invention is a vehicle-mounted system for detecting buried explosives. Neutrons are released into a target region of interest, and the return gamma ray emissions are captured and analyzed. The detected gamma rays in each of a plurality of energy ranges are taken as an indication of the presence or absence of one or more different elemental substances in the region. The output of the system is generated as a function of radiation in those ranges.

FIG. 1 illustrates a vehicle according to one embodiment of the invention. Vehicle 10 generally travels in the direction indicated by arrow A, scanning the ground for buried explosives 20, such as bombs, land mines, and improvised explosive devices (IEDs). Neutron emitter 30 communicates its status and the gamma ray detector 35 communicates the results of each detection to processor 40. In this embodiment, processor 40 determines approximate concentrations of silicon and nitrogen, as will be discussed herein. In alternative embodiments, these intermediate steps are skipped or supplemented. Antenna and GPS receiver 50 enables communication with remote devices and/or persons (for remote driving, feedback, command and control, location detection, and other purposes), and communicates with users regarding the analysis, as will occur to those skilled in the art. Each of the components of vehicle 10 is powered directly or indirectly by power source 60.

Figure 2:
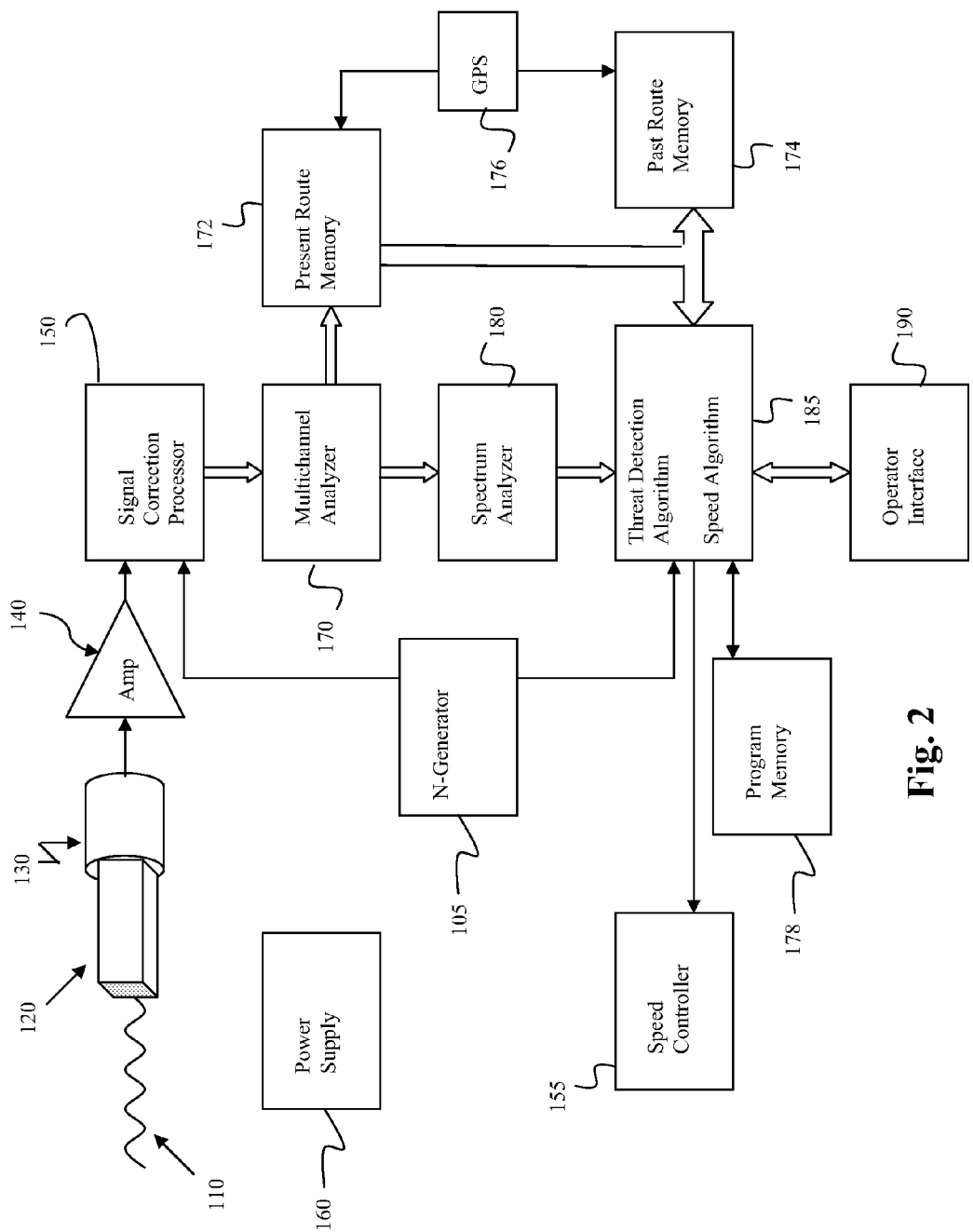
FIG. 2 is a block diagram of a detector and signal processing electronics in the embodiment of FIG. 1.

A signal-oriented view of the system 10 is shown in FIG. 2. Return gamma rays 110 enter sodium iodide (NaI) scintillator crystal 120, passing through to photomultiplier tube (PMT) 130. In this embodiment, crystal 120 is read out using 4" PMTs 130. In this embodiment, a single detector module comprises four NaI scintillator crystals, each measuring 4"×4"×16", though other configurations and detector technologies will be used in other embodiments as will occur to those skilled in the art. In this embodiment, each module is read out as a single detector. This approach improves the absolute photopeak detection efficiency from about 20% for a single crystal to about 50% for the set of four crystals. Other sizes, arrangements, counts, and chemistries can be used with the system, as will occur to those skilled in the art.

The total singles detection rate of about 200 kHz per module that is produced by the combined surface area of the four detectors in this embodiment is well matched to the neutron production rate, when the centers of the detector modules are placed on a circle that has a 40 cm radius centered on the generator. This configuration surveys a "sector" of about 1 $m^2$ of ground surface area. An electronics system capable of reading out each of the detector modules and building the return gamma ray energy spectrum at approximately 2 MHz for a 10 module array, for example, manages the signal processing. Here, for example in FIG. 2, amplifier 140 receives the output of PMT 130 and feeds it to a signal correction processor 150 that corrects the signal for voltage sag due the signal rate variation, then passes the corrected signal to multi-channel analyzer 170. Analyzer 170 integrates the signals for an amount of time set by the operator through the threat detection goal parameters. Once the integration time ends, multichannel analyzer 170 sends the results to spectrum analyzer 180, which produces the measured elemental content for a particular sector of ground. The threat and speed algorithms then use this information to control the speed of the detector system over the ground and determine the presence of threats via speed controller 155. In this embodiment, the detection system can find nitrogen-based explosives over a 1 $m^2$ surface in as little as 0.1 sec.

The control software in this embodiment is stored in memory 178, which software includes programming instructions executable by processor 185 to perform the signal processing and data analysis described herein, and also to dynamically match the output rate of neutron generator 105, the integration time of the signal processor, and desired sensitivity with the speed of vehicle 10 over the ground. In preferred embodiments, detector 130 operates over a broad spectrum (for example, from about 200 keV to 12 MeV), and the system is capable of complete and rapid elemental analysis of the collected data. In some embodiments, the system is programmable to use even more complex trigger or verification criteria.

In the illustrated embodiment, all of these components are powered by power supply 160 using connections that are not shown, but will be understood and implemented in a variety of ways by those skilled in the art. Alternative configurations will also be implemented by those skilled in the art in view of the present description.

In this embodiment, system 10 is capable of moving down a roadway and sensing the presence of explosive materials 20 buried at depths up to 1 m or more depending on the quantity of buried explosives. The system 10 detects the energetic return of gamma rays from neutron excitation of the nitrogen within nitrogen-based explosive material, and also detects oxygen, carbon, and silicon anomalies along its path in order to detect non-nitrogen-based explosives, such as TATP. In addition, the system 10 measures the soil type by measuring $^{28}$Si to correct for the bleed-in or contamination of the nitrogen 10.8-MeV line due to the 10.6-MeV $^{29}$Si line. In addition, hydrogen is measured as an indicator of the amount of water present in the soil. The sensor system is capable of simultaneously detecting other elemental signals, which detection can be used to refine the trigger and/or improve verification of the presence of an explosive.

The detection of buried nitrogen-based explosives is based on gamma ray emission due to neutron capture on nitrogen. Nitrogen is an excellent signature of explosives because soils contain low quantities of nitrogen (typically about 0.1%), while explosives contain large quantities of nitrogen (10% to 40%) by weight.

To provide excellent penetration and little interference, the present embodiment uses the highest-energy bright capture line on nitrogen, which occurs at 10.8-MeV. This particular line has only one significant background, the 10.6-MeV line generated by $^{29}$Si. While this line has a relative small branching ratio, because of the large quantity of soil and the variation of $^{29}$Si in various soil types, it is a major concern in the detection of explosives. The brightness of the $^{29}$Si line varies by one order of magnitude depending on soil type. The $^{29}$Si line is about five times brighter in quartz sands than in world average soils. In order to correct the nitrogen signal for this background, the system simultaneously measures the $^{28}$Si line at 4.9-MeV in order to determine the silicon content of the soil. This line is about 300 times brighter than the 10.6-MeV line, providing a high accuracy measurement of the soil type and excellent leverage for background subtraction of the 10.6-MeV from the signal region. The correction may or may not be required, depending on the detector's energy resolution.

In the case of non-nitrogen-based explosives, of which TATP [$C_9H_{12}O_4$ (dimer) and $C_9H_{18}O_6$ (trimer)] is an example, the system uses a decision variable that is a combination of the signals relating to the elements carbon, silicon and oxygen, and compares the decision variable in the present sector with previous sectors and/or sectors beyond the present sector along the vehicle's path. The system checks for anomalous elemental characteristics of each sector in turn. The system records the GPS location of each sector and the decision variable in the present route memory 172. Once analyzed, each sector is given a threat status, either "threat detected" or "no threat present." This signal may, for example, be recorded for future analysis, immediately acted upon, or presented to a user through operator interface 190.

In addition, the system records the elemental signal for each sector and its GPS location in the present route memory 172. Upon completion of a scan of a path, for example, this data is then moved to and maintained in past route memory 174. In this way the system can compare the values presently measured at one point in time (from memory 172) with values recorded during the last survey along that same track or path (from memory 174). This data may, for example, be stored, indexed, and retrieved on the basis of GPS data 176. An anomaly in the difference indicates a disturbed soil, and thus a possible threat; this signature along with a nitrogen-based explosive signature or non-nitrogen-based decision variable yield a high probability of a true threat. This multi-sample approach of some embodiments of the system is a powerful method to reduce false positives, especially in the case of non-nitrogen-based explosives.

This exemplary embodiment uses an array of NaI detectors to measure the return gamma ray signal. This implementation, according to simulations, is capable of finding a single M107-155 mm shell containing 20.1-kg RDX, buried in a hole 45-cm below a roadway at a travel speed of 1-3 msec depending on soil type with a detection probability of 99.5% and a false-positive rate of 1 per kilometer. The false-positives are cleared by rescanning the location.

In alternative embodiments, the detectors are improved energy resolution gamma ray detectors, such as HPGe and liquid noble gas detectors. These detectors would have energy resolution capable of completely resolving the $^{29}$Si and $^{14}$N lines, eliminating the $^{29}$Si background. With these improvements, the alternative embodiments will be capable of finding a single M107-155 mm shell containing 20.1-kg RDX buried 30-cm below a roadway at a travel speeds of above 10-m/sec and at 2-m/sec if buried at 60-cm.

Generally, system 10 employs pulsed neutron elemental analysis to identify nitrogen-based explosives on or below the surface. This implementation uses (1) a single deuterium-tritium (D-T) neutron generator capable of pulsed-mode operation producing up to $10^9$ n/sec (e.g., $3 \times 10^8$) at 14 MeV, (2) a detector system for which an array of (e.g., 10) NaI detector modules, each composed of four 4" by 4" by 16" deep detectors in this example, which are centered on a 40-cm radius, circular arc around the generator, in order to survey approximately 1-m$^2$ of surface area, (3) an electronics system capable of reading out each of the detector modules and building the return gamma ray energy spectrum at approximately 2-MHz, and (4) a computer controlled analysis system capable of finding nitrogen based explosives over a 1-m$^2$ surface as rapidly as 0.1-sec.

The control software matches the neutron generator rate, the electronics integration time and the desired sensitivity with the system speed over the ground. In addition, because the energy spectrum extends from ~200-keV up to 12-MeV, the system is capable of a complete and rapid elemental analysis of the collected data to include more complex trigger or verification criteria.

Figure 3:
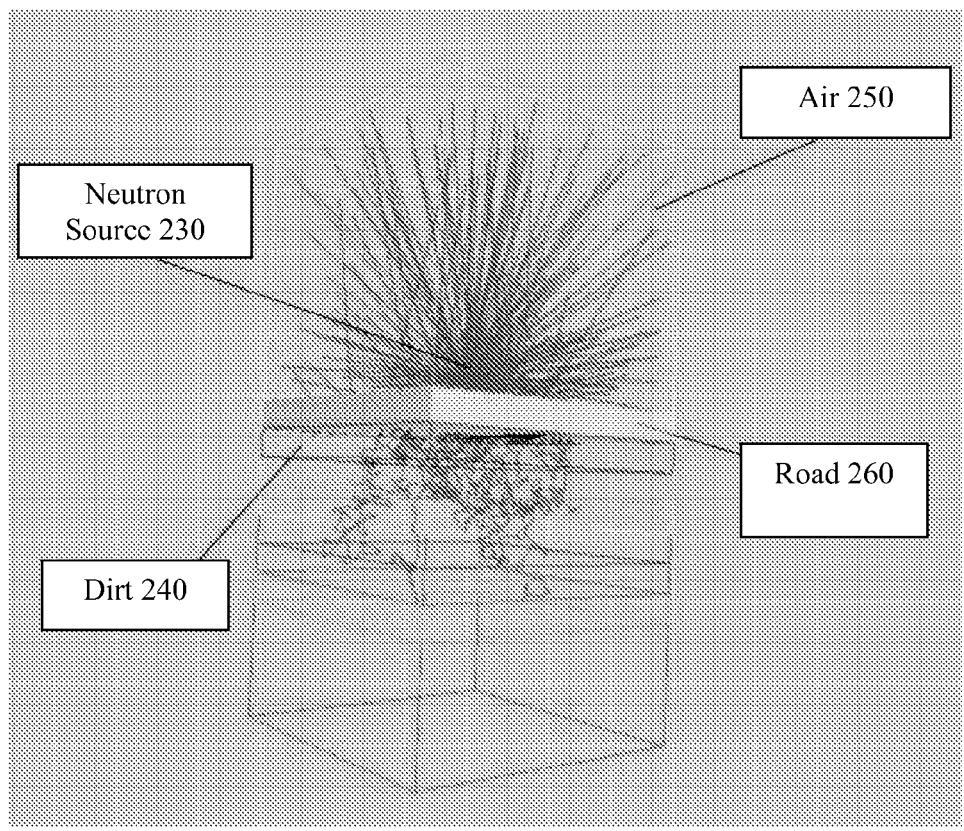
FIG. 3 illustrates simulated neutron tracks from a Monte Carlo N-Particle (MCNP) simulation of neutron paths in a model of the embodiment of FIG. 1.

As shown in FIG. 3, the neutron generator 230 produces, for example, a ~10-μsec, 14-MeV neutron pulse 10-cm above the surface of road 260, during which time the detector system is gated off for the detection of neutron capture signals. As the neutrons propagate through the soil 240, they will collide with elements in the soil, losing energy in each collision until they approach thermal energy. This slowing down process continues with an exponential fall for a period of ~200-μsec. After the neutron pulse is over the detector system is gated on for ~200-μsec, or approximately 1 neutron dieway time constant. During this time the 10.8 MeV return gamma ray signal from neutron capture on nitrogen and returns indicating other elements are detected.

In another embodiment, the neutron pulse may be 100-μsec long. During this time fast neutron reactions are collected. Then the neutron generator may be turned off for 200-μsec for the collection of neutron capture reactions. In this way, fast and slow neutron reactions are collected during the same sector integration time period.

Use of a D-T neutron generator (E=14-MeV) is somewhat preferred over either californium sources ($E_{average}$~1-MeV) or D-D generators ($E_{average}$~2-MeV). The 14-MeV neutrons penetrate more deeply into the soil before interacting. For this reason there are fewer surface interactions with the soil, significantly reducing the background to the detectors. In addition, the top layer of the soil helps shield the detectors from the many low-energy gamma rays that are produced deeper in the soil nearest the detectors. D-D or $^{252}$Cf sources tend to "blind" the detectors because of the higher surface brightness they produce, using up detector bandwidth and thus requiring lower overall neutron flux rates and sensitivity.

$^{252}$Cf sources have two additional disadvantages compared to a D-T generator. The first is that pulsed mode operation reduces noise background by a factor of ~10, and $^{252}$Cf cannot be pulsed. The second disadvantage involves radiation safety issues that result from its always-on operation.

The time required to detect an explosive at depth requires both the expected explosives signal and backgrounds be understood. Thus the signal-to-noise ratio is the relevant measure, based on which the system sets its speed over the ground, the quantity of explosive detectable in a given integration time and the depth sensitivity. There are three backgrounds that need to be understood in the case of nitrogen based explosives detection. The first is the thermal neutron capture reaction on $^{29}$Si, which produces a 10.6-MeV gamma ray. The second is neutron capture on nitrogen in the soil. The final background source is the continuum in the 10.8-MeV signal energy range. The continuum background counts can originate from Compton scattering of other elemental signals into the signal region, pulse pileup, and neutron interactions in the detector. The strength of each of these background sources has been estimated using experimental data collected with HPGe detectors. Each will be discussed in turn.

(1) Nitrogen Background

Nitrogen is an excellent signature of explosives, because soils contains low quantities of nitrogen (0.1%), while explosives contain large quantities of nitrogen (10%-40%) by weight. Nitrogen in soils will not be a significant source of background and can be neglected. There are two reasons for this. First, unlike explosive materials, nitrogen is mixed with $^{29}$Si in soils. For this reason it must compete for neutrons with silicon, a significant component of soils representing on average 33% of soil by weight. While nearly all nitrogen is $^{14}$N, having an isotopic abundance of 99.6%, its cross section for thermal capture, 75 mb, is smaller than that of $^{29}$Si (92.2% natural abundance), 120 mb. Of the neutrons captured on $^{14}$N, only 14.2% actually produce a 10.8-MeV gamma ray. This situation is compounded for soils with significant water content. Hydrogen has a thermal capture cross-section of 300-mb. Considering the small cross section times branching ratio relative to $^{29}$Si and hydrogen, and the small percentage of soil made up of nitrogen relative to silicon, the nitrogen background is negligible.

Figure 5:
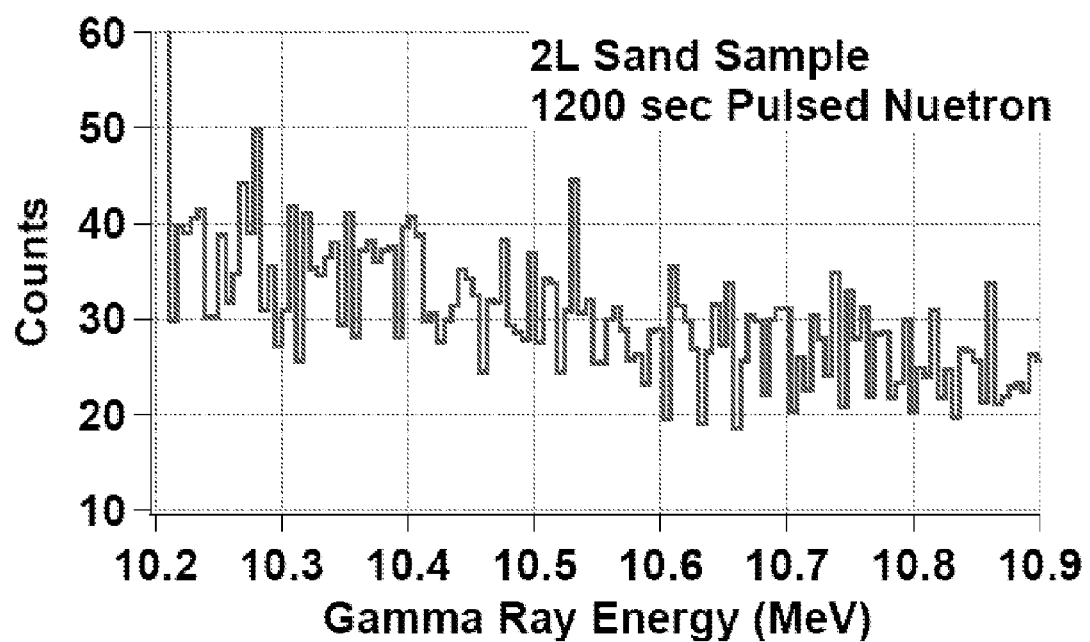
FIG. 5 is a pair of gamma ray spectra collected from sand and C-4 samples using HPGe detectors and a neutron generator.

This expectation is verified by experimental data shown in FIG. 5, which graphs data collected using HPGe detectors and a neutron generator, analyzing quartz sand with approximately 10% water content. No visible nitrogen signal is observed. The experimental configuration consisted of two 100% HPGe detector placed ~2-cm from the surface of a 2-liter plastic bottle filled with sand. The bottle was interrogated by a broadband neutron flux at ~3×10$^7$ for 1200 seconds. To compare, at 1-m/s travel speed the discussed system interrogates ~1-m$^3$/sec. The closest soil to the detectors is 10-cm away. With these considerations the 1200-sec data set represents more than enough integrated collection time to compensate for the increased detector area and generator flux of the discussed system to prove that nitrogen in soil is not a background consideration.

In addition, due to the very low density of nitrogen in air, it does not produce a signal in the detectors in the present embodiment.

TABLE 1

Detector properties

| Detector Type | $\sigma_{E, 10.8}$ (keV) | Density (g/cm$^3$) | Radiation Length (cm) | Maximum Rate (kHz) | Time Resolution (μsec) | Fractional Overlap of $^{29}$Si Counts |
|---|---|---|---|---|---|---|
| BGO | 151$_{[3]}$ | 7.13 | 7.13$_{[4]}$ | 200 | 1 | 0.570 |
| NaI(Tl) | 125$_{[3]}$ | 3.67 | 2.59$_{[4]}$ | 200 | 1 | 0.460 |
| LKr | 50 | 2.4 | 4.72$_{[5]}$ | 1000 | 0.2 | 0.00621 |
| HPGe | 9 | 5.323 | 2.30$_{[6]}$ | 40 | 10 | 0 |

(2) 29Si Background

The $^{29}$Si, 10.6-MeV gamma ray is reported to be the most significant background for this application. This background occurs because NaI detectors have a measuring resolution that does not completely resolve the $^{29}$Si, 10.6-MeV line from the $^{14}$N, 10.8-MeV line. The fractional overlap of these two lines is shown in Table 1 along with other properties of important detector types. The selection of more advanced detectors (Liquid Noble Gas (LKr/LXe) detectors or HPGe, for example) having energy resolution much less than the line separation between the $^{29}$Si, 10.6-MeV line and the $^{14}$N, 10.8-MeV line would completely eliminate $^{29}$Si as a background.

On average, soil contains 33.3% by weight silicon, of which 4.683% is $^{29}$Si. The total thermal capture cross section on $^{29}$Si is 0.12-barns. Of the captures produced in $^{29}$Si, 7.6% result in a background 10.6 MeV line, which interferes with the nitrogen signal region when NaI detectors are used.

The present system automatically corrects the signal region for the presence of $^{29}$Si (10.6-MeV) by leveraging off the $^{28}$Si (4.933-MeV) line. Including the difference in detection efficiency between the two lines, the lever is greater than ~300:1. Therefore the error in the expectation of the number of counts in the signal region due to $^{29}$Si (10.6-MeV) can be known to an accuracy, $$\delta n_{10.6} : \frac{1}{\text{lever}} \delta n_{4.9},$$

where δn is the error in the number of counts. It is expected that the error in the 4.9-MeV line will be ~1%, yielding an extremely small error in the expectation of the 10.6-MeV contribution to the nitrogen signal. In this way soil type variations will not affect the system's ability to distinguish explosives from variations in soil types.

In addition, because the high counting statistics of the $^{28}$Si (4.933-MeV) line, its line width will be used to monitor the energy resolution of the detector system at 10.8-MeV. Variations in line width affect the expected background in the signal region from both the $^{29}$Si (10.6-MeV) and from continuum background.

Figure 6A:
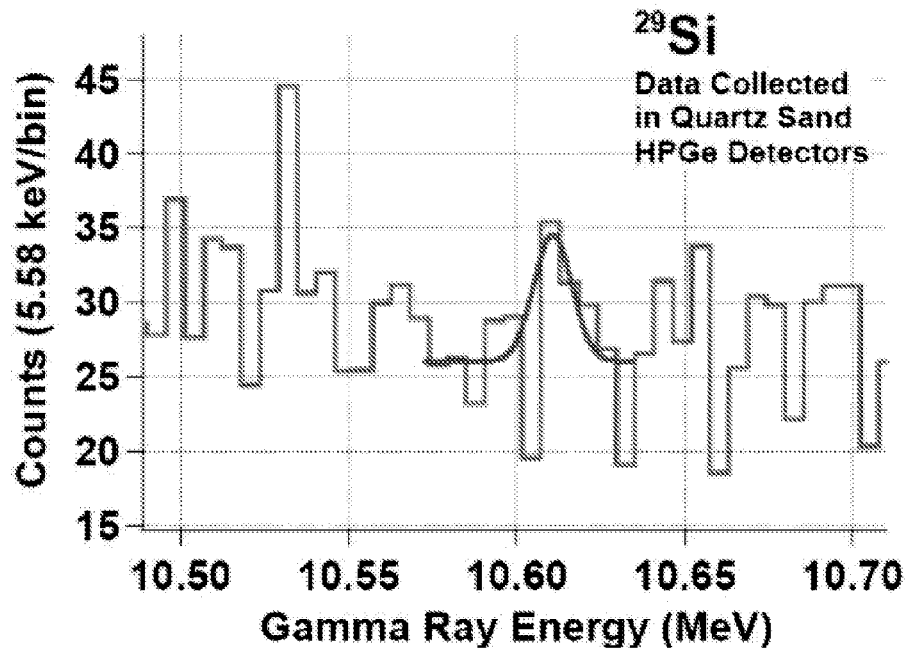
FIG. 6 is a pair of graphs illustrating gamma ray returns from $^{28}Si$ and $^{29}Si$ in quartz sand.
Figure 6B:
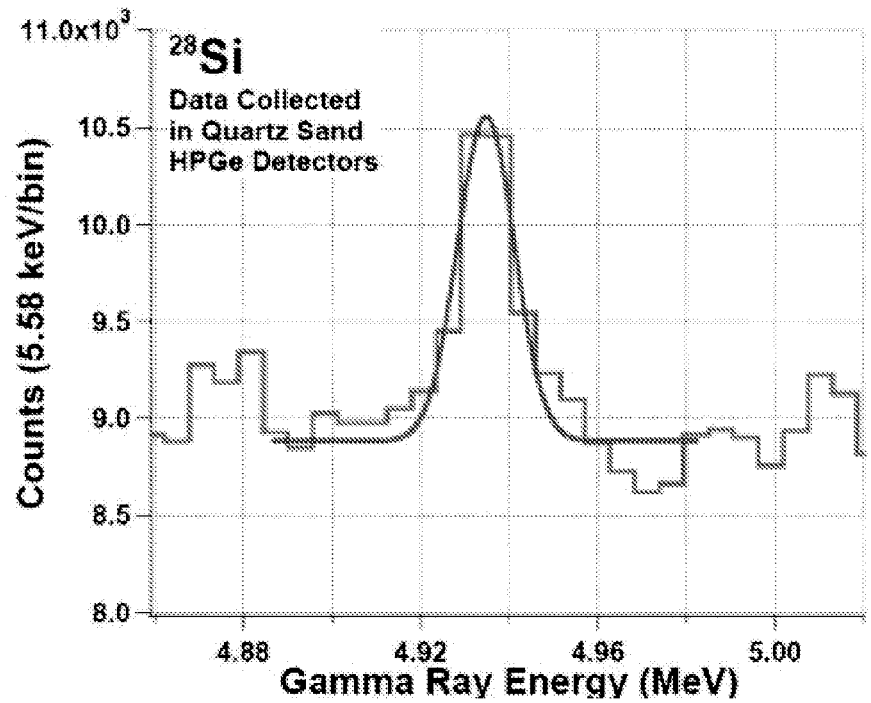

FIG. 6 shows the $^{28}$Si (4.933-MeV) line collected using 2-L of quartz sand with two 100% HPGe detectors. The ratio of signals in this embodiment is measured to be ~500:1, once detector efficiency as a function of energy is included as expected.

(3) Continuum Background

Figure 7:
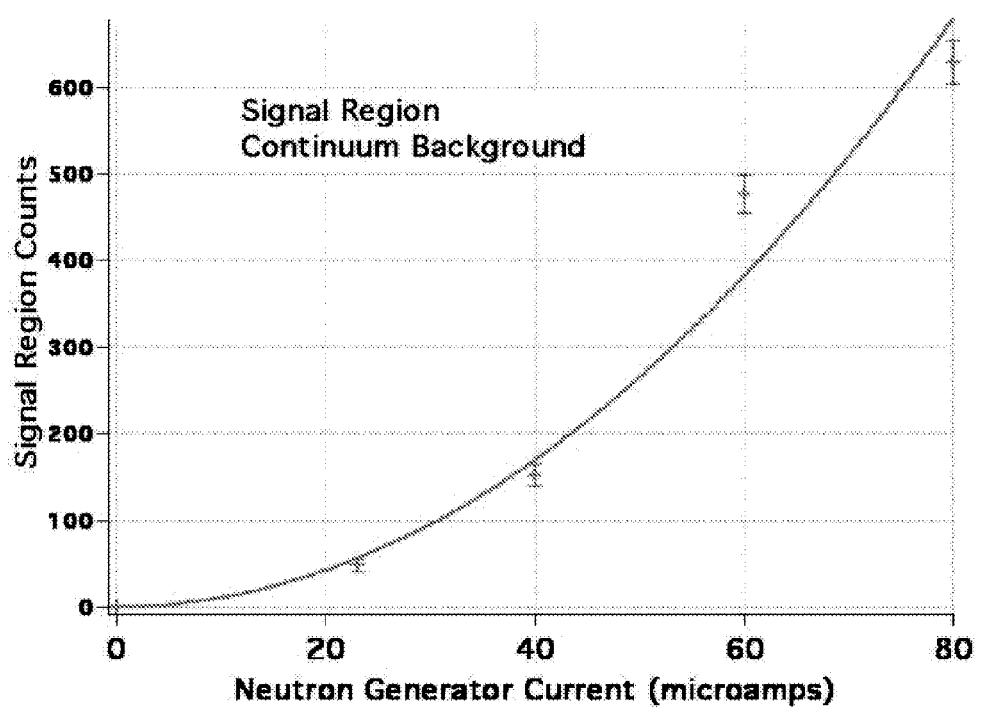
FIG. 7 is a graph of continuum background as a function of generator current, which is proportional to the neutron flux, in the 10.8-MeV nitrogen signal region for the same sample as was used in FIG. 6.

Data collected on quartz sand samples has shown that the continuum background at gamma ray energies above 10-MeV are largely due to the detection of two lower energy gamma rays within the resolving time of the detectors causing the system to interrupt the sum of their energies as a single gamma ray event. As expected this background is proportional to $$Background \sim R^2 \delta t$$

where R is the detector singles rate and $\delta t$ is the resolving time of the detector. The background from this data set, collected using HPGe detectors as a function of neutron flux or the detector's single rates when corrected for dead time, is shown in FIG. 7. Fits of the data cannot support a linear term with rate stronger than ~5%. Because the data can not support a linear term in the fit, it is concluded that Compton scattering of higher energy gamma rays into the nitrogen signal region is not present when interrogating soils with 14-MeV neutrons. The Compton scattered gamma ray flux would be proportional to the neutron generator current. Likewise neutron interactions in the detector would be linearly proportional to the neutron generator current. These conclusions are reasonable when the binding energy of nucleons and the recoil energy of nuclei are considered.

To accomplish the rapid data collection rates in the case crystal detectors are readout by photomultiplier tubes, each photomultiplier output will be corrected to compensate for gain sag as a function of neutron die-away due to loss of detector gain as a function of singles rate variation as a function of time, measured here from the end of the neutron pulse.

The integrated gamma ray energy spectra stored in each of the ten MCA cards 170 will be passed to the signal processing CPU. The threat analysis consists of taking the spectra and searching for the gamma ray lines corresponding to the elements of interests. The decision parameter for nitrogen is simply the confidence level of the presence of nitrogen taking into account the predicted background signals. Because the entire spectrum is collected extending from less than 200-keV range to 12-MeV and above. More complex trigger and confirming analysis algorithms can be implemented to improve sensitivity and decrease the false-positive rate.

Non-Nitrogen Based Explosives

Figure 8:
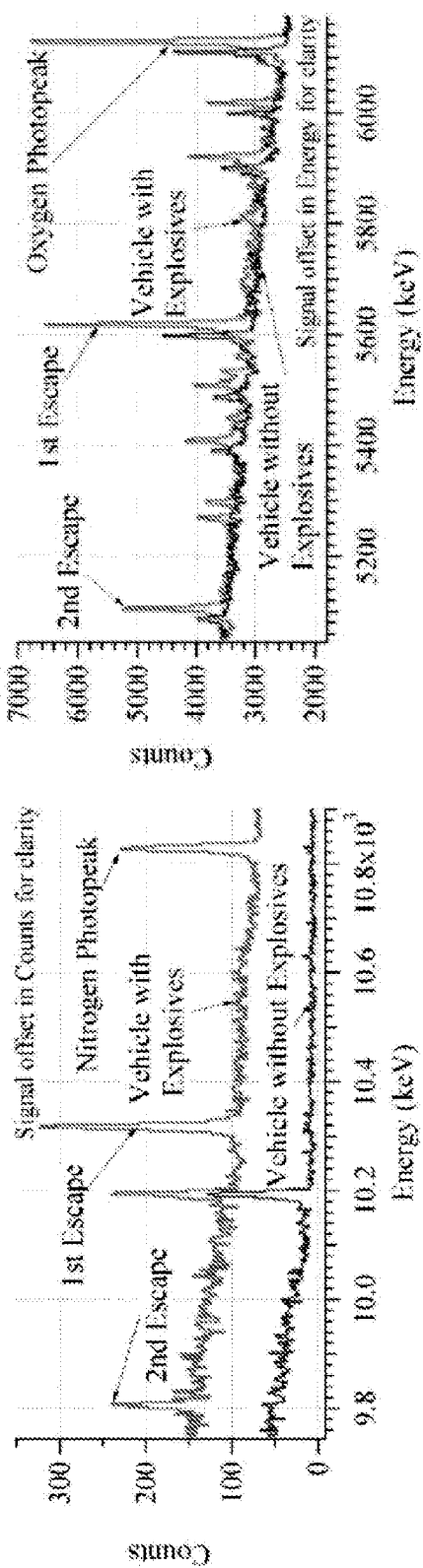
FIG. 8 is a graph comparing the nitrogen and oxygen signals for an empty vehicle and the same vehicle carrying 68 kg of ammonium nitrate.
Figure 11:
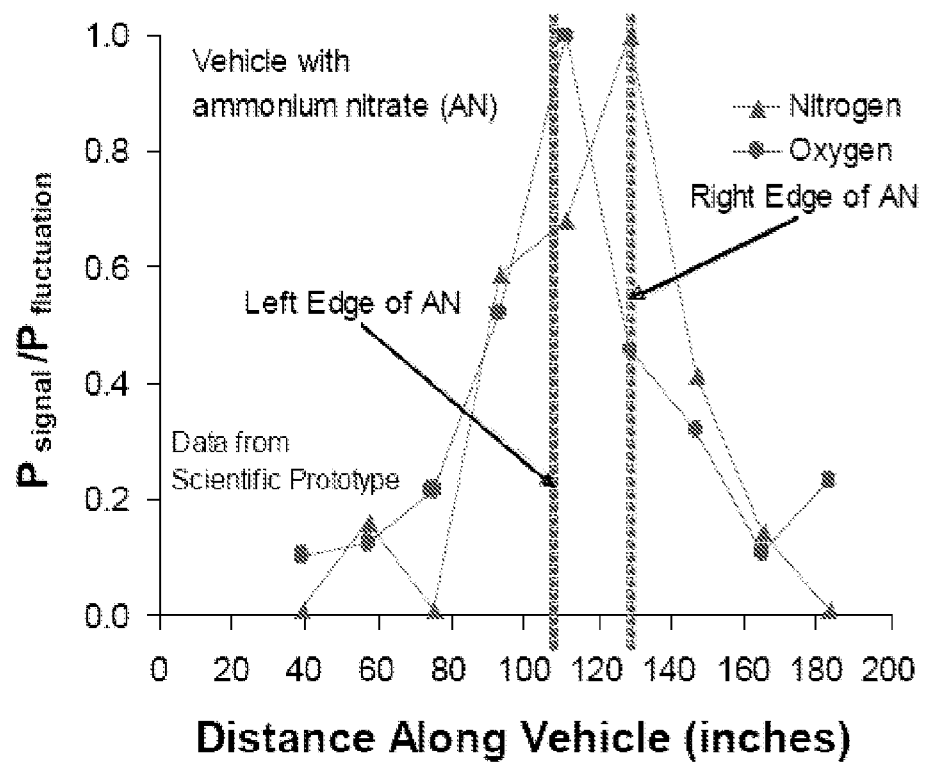
FIG. 11 is a graph of the effectiveness of a selected, normalized decision variable for detection of ammonium nitrate as a function of distance along a vehicle carrying a container thereof.

The system searches for non-nitrogen based explosives by performing (n, n') excitation of oxygen and carbon within the explosive through neutron scattering reactions. Because these elements are present in the ground the system uses a decision variable formed from the significance $O_k$ of element k in each scanned sector, measuring approximately 1 m$^2$. The threat algorithm calculates a decision parameter, $\epsilon_i^k$, in each sector i for each element k as $$\epsilon_i^k = \frac{\theta_i^k - \left(\frac{1}{N-1}\right)\sum_{j \neq i}\theta_i^k}{\left(\frac{1}{N-1}\right)\sum_{j \neq i}\theta_j^k},$$

where N is the number of sectors and $\theta_i^k$ is the statistical significance of a specific elemental signal. This decision parameter checks whether a given sector has an anomalous elemental signal relative to the average nearby sectors. To illustrate the effectiveness of this approach, FIG. 8 compares the oxygen signals for the empty vehicle and a vehicle with 68 kg of ammonium nitrate (AN) in the vehicle backseat. The difference between the empty vehicle and for 68 kg AN is evident for both signals. The effectiveness of the normalized decision variable as a function of distance along the vehicle is shown in FIG. 11.

Various combinations of these basic elemental decision parameters can be formed to produce the optimal sensitivity to non-nitrogen based explosives. For example, the combination $(\epsilon_{oxygen}/\epsilon_{silicon}) \cdot \epsilon_{carbon}$ is very useful in soils composed of largely of sand, as carbon is not typically present in sand, and silicon is not present in the explosive. This variable is not sensitive to many benign variations in the ground composition it measures. For example if the system were to pass over a stream of water, the $\epsilon_{carbon}$ would remain zero even though the $\epsilon_{silicon}$ would drop significantly and the $\epsilon_{oxygen}$ would increase, so the system would not indicate a threat.

System Performance

System performance can now be understood using calculated signal and background rates based on collected data and MCNP neutron and gamma ray modeling simulations. The performance criteria for the present embodiment is to achieve 99.5% detection probability of a single M107-155 mm shell containing 20.1-kg RDX, buried in a hole 35-cm below a roadway at a travel speed of 1-3 msec depending on soil type with a detection probability of 99.5% and a false-positive rate of 1 per kilometer. The false-positives are cleared by rescanning the location.

In the computer model a simple cylinder, 15-cm in diameter and 60.5-cm long, was used to represent an M107 155-mm shell containing 20.1-kg RDX. The cylinder included a 0.5-inch steel shell wall. The shell was placed flat or laid sideways into the hole. The steel shell was nearly transparent to neutrons, and its effect on the return gamma ray propagation was easily accounted for by using a simple attenuation factor. In addition, cubes containing RDX, 100-kg (38-cm on a side) and 200-kg (50-cm on a side) were modeled.

Two soil types were used in the studies: pure quartz sand with 10% moisture and world average soil. Above the soil, a 10 cm thick layer of concrete was placed to represent the road surface. For completeness the model included air 250. The neutron generator source was placed 10 cm above the concrete surface. To compute the reaction rate at varying depth, the position of the M107 155-mm shell was varied. In the signal plots the cylinder depth was measured from the top of the road to the lower edge of the shell. By this definition, a shell at zero depth would lay on the road surface. The output of this simulation is shown in FIG. 3.

Figure 4:
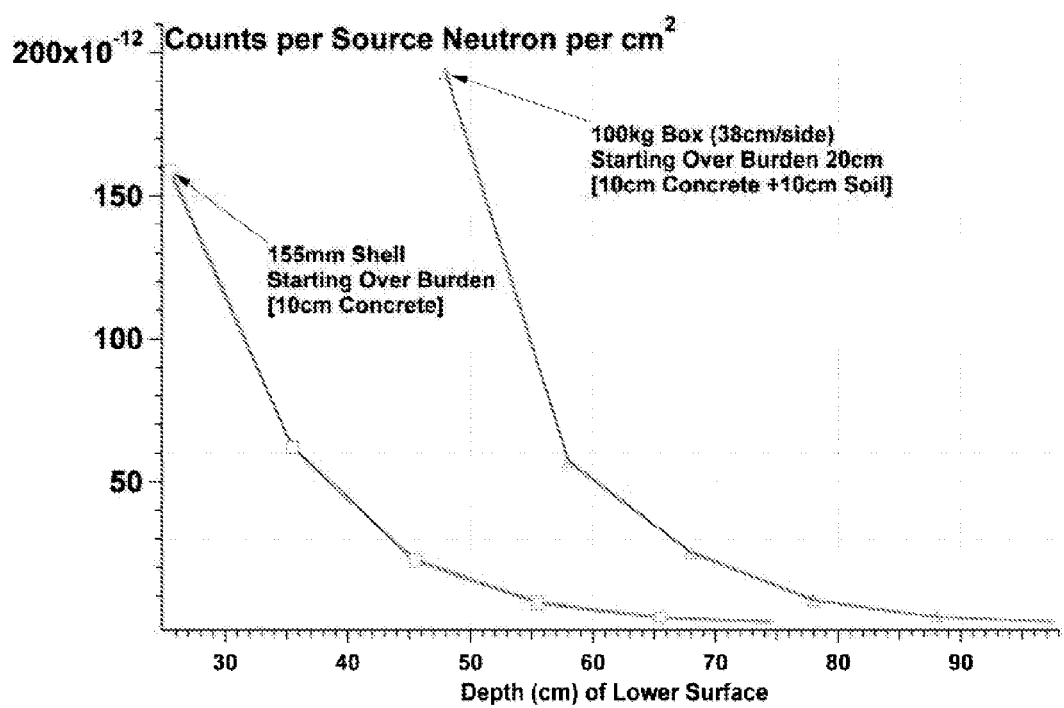
FIG. 4 is a graph of gamma ray return rate as a function of starting neutron per $cm^2$ of detector area, for two simulated uses of the system of FIG. 1.

The expected signal rates per cm$^2$ of detector area are shown in FIG. 4. The true signal rate can be calculated using FIG. 4 by multiplying by the detector efficiency ($\epsilon$~0.5), the total detector cross-sectional area (~4000-cm$^2$) and the neutron generator rate (3×10$^8$). The return signal is a very strong function of depth. There is a simple r$^{-4}$ geometric fall off of the signal with the depth of the buried explosive and exponential fall off of the neutron flux with distance due to neutron capture and the attenuation of the return gamma ray as it scatters exiting the soil and as it passes through the steel shell.

TABLE 2

The expected signal from explosive per source neutron per cm$^2$ assuming 100% gamma ray detection efficiency. Depth determines the depth of the hole into which the explosive was placed. It is measured from the top surface of the roadway to the bottom of the hole in the model.
Expected Signal from Explosive at Depth Per Source Neutron Per cm$^2$

| 155-mm Shell | | 100-kg Box (38 cm cube) | | 200-kg Box (50 cm cube) | |
|---|---|---|---|---|---|
| Depth (cm) | Signal (cm$^{-2}$) | Depth (cm) | Signal (cm$^{-2}$) | Depth (cm) | Signal (cm$^{-2}$) |
| 35.5 | $1.59 \times 10^{-10}$ | — | — | — | — |
| 45.5 | $6.21 \times 10^{-11}$ | — | — | — | — |
| 55.5 | $2.25 \times 10^{-11}$ | — | — | — | — |
| 65.5 | $7.73 \times 10^{-12}$ | 60 | $1.52 \times 10^{-10}$ | 60 | $3.99 \times 10^{-10}$ |
| 75.5 | $8.25 \times 10^{-13}$ | 70 | $3.93 \times 10^{-11}$ | 70 | $1.26 \times 10^{-10}$ |

TABLE 3

Expected $^{29}$Si background. The true background rate can be calculated using the table values multiplied by the detector efficiency ($\epsilon$~0.5), the total detector cross sectional area (~4000-cm$^2$) and the neutron generator rate ($3 \times 10^8$ n/s).
Expected 10.6 MeV Background per Source Neutron per cm$^2$

| World Average Soil, Rate (per sec) | Pure Quartz Soil, Rate (per sec) |
|---|---|
| $1.09 \times 10^{-11}$ | $4.22 \times 10^{-11}$ |

The continuum background for the NaI detectors can be found from the HPGe data set by using the equation:

$$B_{NaI,continuum} = \frac{\sigma_{NaI}}{\sigma_{HPGe}} \frac{R_{NaI}^2}{R_{HPGe}^2} \frac{\Delta t_{NaI}}{\Delta t_{HPGe}} B_{HPGe,continuum}$$

where σ refers to detector energy resolution, B is the number of continuum background counts, $R_{det}$ is the detector single rates, and Δt is the time resolution of the detector. The HPGe data was collected at rates up to 32-kHz with a resolving time of 10-μsec. The NaI will operate by ganging 4 standard NaI detectors together and reading them out as a single detector at rates up to ~200-kHz with a resolving time of 1-μsec.

From these calculations the expected continuum background in the signal region is estimated to be 4.2 Hz in the present embodiment when operating at $3 \times 10^8$ n/sec, independent of soil type.

Figure 9:
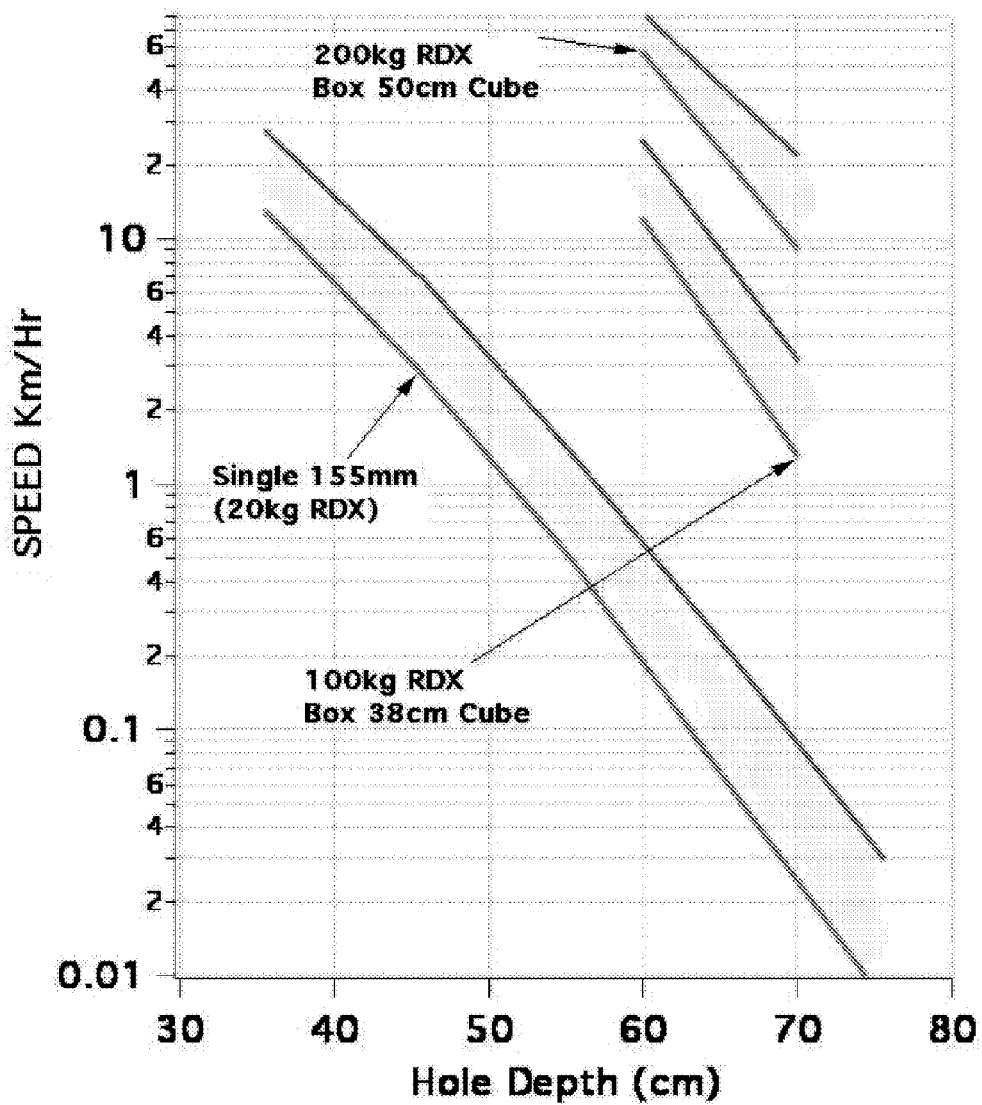
FIG. 9 is a graph of performance curves for analysis by the system of FIG. 1 of three explosive targets over a variety of hole depths in average soil and quartz sand.

FIG. 9 quantifies performance of the system in this exemplary embodiment. The performance curves were generated for two soil types. Quartz sand with 10% water content produces the worst case performance because of the large $^{29}$Si, 10.6-MeV background it produces. This case is the lower curve for each explosive quantity displayed. World average soil is more typical and is the upper curve for each explosive quantity displayed. To quantify system performance, a quantity of explosive and a depth requirement is selected. At the corresponding speed found in the FIG. 9, the system will achieve 99.5% detection probability with a false-positive rate of 1 per kilometer for the selected quantity of explosive at the selected depth.

For example from FIG. 9, the system can detect a single M107-155 mm shell placed flat, that is laying sideways in a hole 35.5 cm deep in a roadway while traveling 13-km/hr. The over burden is 10-cm concrete and 10-cm quartz sand in this case. At this speed, the system would also be sensitive to 200-kg of RDX (a 55-gal drum) buried in a hole nearly 70-cm deep. The over burden in this case is 10-cm concrete and 10-cm quartz sand. Depth as displayed in the figure is the depth of the hole into which the explosive was placed. It is measured from the top surface of the roadway to the bottom of the hole in the model.

The singles rate, ~200-kHz, which is proportional to the surface area of the four detector module in the exemplary embodiment is well matched to the neutron generator flux capability. The system's NaI detector arrays comprise 10 detector modules, each composed of 4 standard NaI crystals. The detector modules are centered on a 40-cm arc around the neutron generator. The detector head sweeps out a 1-m wide swath along the system's path. The system integrates signals over a 1-m$^2$ area independent of the vehicle's programmed speed. Integration times are coordinated with the desired sensitivity and the speed is adjusted automatically. The system's data acquisition system is designed to accepted 0.1-sec integration time over an area of 1-m$^2$ or speeds up to 10-m/sec.

The system can be constructed to sweep larger swaths by adding detector heads together, as will occur to those skilled in the art.

To accomplish rapid data collection rates, each photomultiplier output in the present design is corrected to compensate for the neutron die-away or singles rate variation as a function of time, clocked from the ending of the neutron pulse. The system produces a rate-dependent correction factor for the multi-channel analyzers that will keep the energy resolution of the NaI detectors constant over the 10-kHz neutron pulse cycle. A schematic of the electronics is shown in FIG. 2.

The integrated gamma ray energy spectra stored in each of the ten MCA cards will be passed to the signal processing CPU. The threat analysis consists of taking the spectra and searching for the gamma ray lines corresponding to the elements of interest. The decision parameter for nitrogen is simply the confidence level of the presence of nitrogen taking into the predicted background signals. Because the entire spectrum is collected extending from less than 200-keV to above 12-MeV, more complex trigger and confirming analysis algorithms can be implemented to improve sensitivity and decrease the false-positive rate, as will occur to those skilled in the art.

Unlike many x-ray based systems, neutron elemental analysis requires no operator interpretation of the collected data. The system simply reports the presence of a threat and asks if the operator would like to rescan the location of the threat to confirm its presence. To reconfirm the system stops and retraces it path to the location of the threat. A longer confirmation scan is collected which will clear the threat in the case of a false-positive or verify the presence of an explosive.

Radiation Safety

Figure 10:
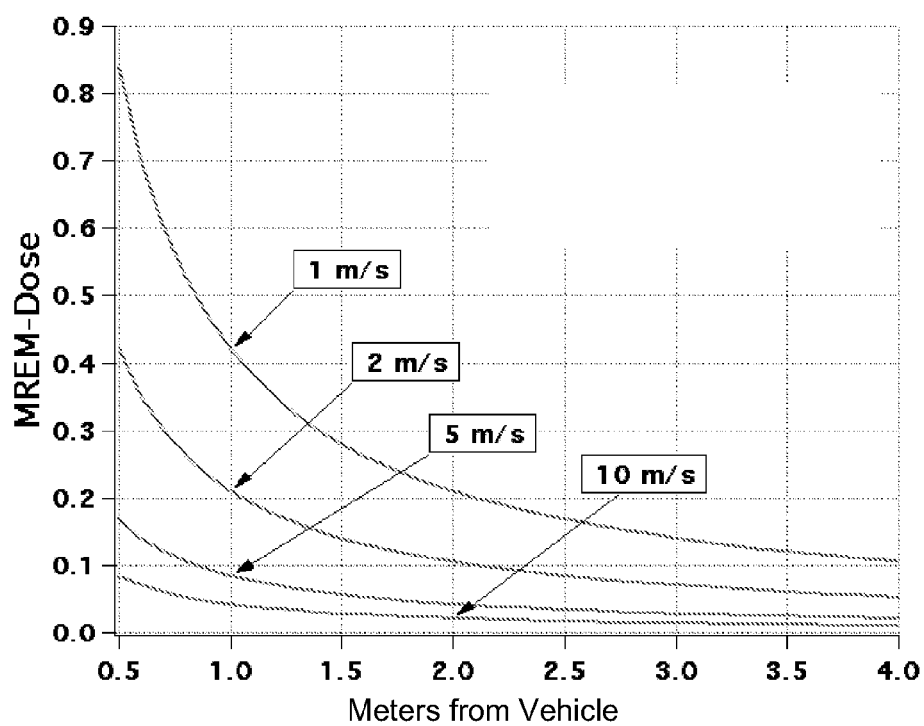
FIG. 10 is a graph of radiation exposure of an operator or bystander as a function of distance from the system illustrated in FIG. 1.

The radiation dose received by a stationary observer as close as 1-m from the present embodiment as it moves past at 1-m/sec is approximately 0.4-mrem, proportionately less for higher speeds, as shown in FIG. 10. This might be compared to a "radiation zone," defined by the U.S. Nuclear Regulatory Commission (NRC) standards as an area with a dose greater than 2-mrem in one hour. Because the dose levels as the system passes by are well within the allowed yearly public non-beneficial does of 100-mrem set by NRC standards, the low dose rate produced by this exemplary embodiment would allow it to operate in populated settings.

An operator keeping pace behind system 10 at 30-m would have a dose rate of 0.5 mrem/hr. Five hundred hours of operation would result in a 100-mrem total dose, equivalent to that allowed by NRC for non-beneficial public exposure. A 0.6-m thick polyethylene shield can be placed within the vehicle 10 that drops the backward radiation dose at 30-m to 0.05 mrem/hr for a following operator. This would expose a following operator to 100-mrem after 2000-hours of operation, equivalent to a standard work year.

All publications, prior applications, and other documents cited herein are hereby incorporated by reference in their entirety as if each had been individually incorporated by reference and fully set forth. While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A system for detecting explosive material, comprising:
   a neutron generator that emits neutrons toward a region of interest in space for a first period of time;
   a gamma ray detector, situated relative to the neutron generator and the region of interest to detect gamma radiation from excitation of material in the region of interest by the neutrons, that for a second period of time after the first period of time substantially simultaneously quantifies the amount of detected radiation in a first energy range and the amount of detected radiation in a second energy range; and
   a processor that processes the output of the gamma ray detector to produce a detection output signal as a function of the amount of radiation in the first energy range and the amount of radiation in the second energy range;
   wherein the second period of time ends 0.1 second or less after the end of the first period of time.

2. The system of claim 1, wherein:
   the amount of detected radiation in the first energy range varies both with the amount of explosive in the region and the amount of a second elemental substance in the region, and
   the amount of detected radiation in the second energy range varies with the amount of the second elemental substance in the region.

3. The system of claim 2, wherein the second elemental substance is silicon.

4. The system of claim 2, wherein the second elemental substance is a silicon isotope.

5. The system of claim 1, wherein
   the processor also produces a sensitivity signal as a function of the amount of radiation in the first energy range and the amount of radiation in the second energy range; and
   the sensitivity signal quantifies the sensitivity of the system to the presence of a particular substance in the region of interest.

6. The system of claim 1, wherein the processor also produces an interference-level signal that indicates the concentration of an elemental substance in the region of interest, where the substance causes radiation in both the first and second ranges.

7. The system of claim 1, wherein the processor also produces a background-level signal that indicates the level of radiation detected in the absence of any radiation from particular elemental substances.

8. The system of claim 1, wherein the second period of time is about 200 µs.

9. A method of detecting explosives, comprising:
   directing neutrons toward a region of interest in space during a first period of time;
   detecting gamma radiation during a second period of time following the first period of time from excitation of material in the region of interest by the directed neutrons;
   substantially simultaneously quantifying the amount of detected radiation in a first energy range and the amount of detected radiation in a second energy range;
   processing the output of the quantifying step to produce a detection output signal as a function of the amount of radiation in the first energy range and the amount of radiation in the second energy range;
   wherein the second period of time ends 0.1 second or less after the end of the first period of time,
   the amount of detected radiation in the first energy range varies with the amount of nitrogen in the material, and
   the amount of detected radiation in the second energy range varies with the amount of a second elemental substance in the material.

10. The method of claim 9, wherein the second elemental substance is silicon.

11. The method of claim 10, wherein the second elemental substance is a single silicon isotope.

12. The method of claim 9, wherein
   a further output of the processing step is a sensitivity signal as a function of the amount of radiation in the first energy range and the amount of radiation in the second energy range; and
   the sensitivity signal quantifies the sensitivity of the system to the presence of a particular substance in the region of interest.

13. The method of claim 12, wherein the system uses the sensitivity signal to automatically control a speed of movement of the system.

14. The method of claim 9, wherein a further output of the processing step is an interference-level signal that indicates the concentration of an elemental substance in the region of interest, where the substance causes radiation in both the first and second ranges.

15. The method of claim 9, wherein a further output of the processing step is a background-level signal that indicates the level of radiation detected in the absence of any radiation from particular elemental substances.

16. The system of claim 9, wherein the second period of time is about 200 µs.

* * * * *